(No Model.)
H. A. VEAZIE.
WHEEL TIRE.
No. 563,823. Patented July 14, 1896.
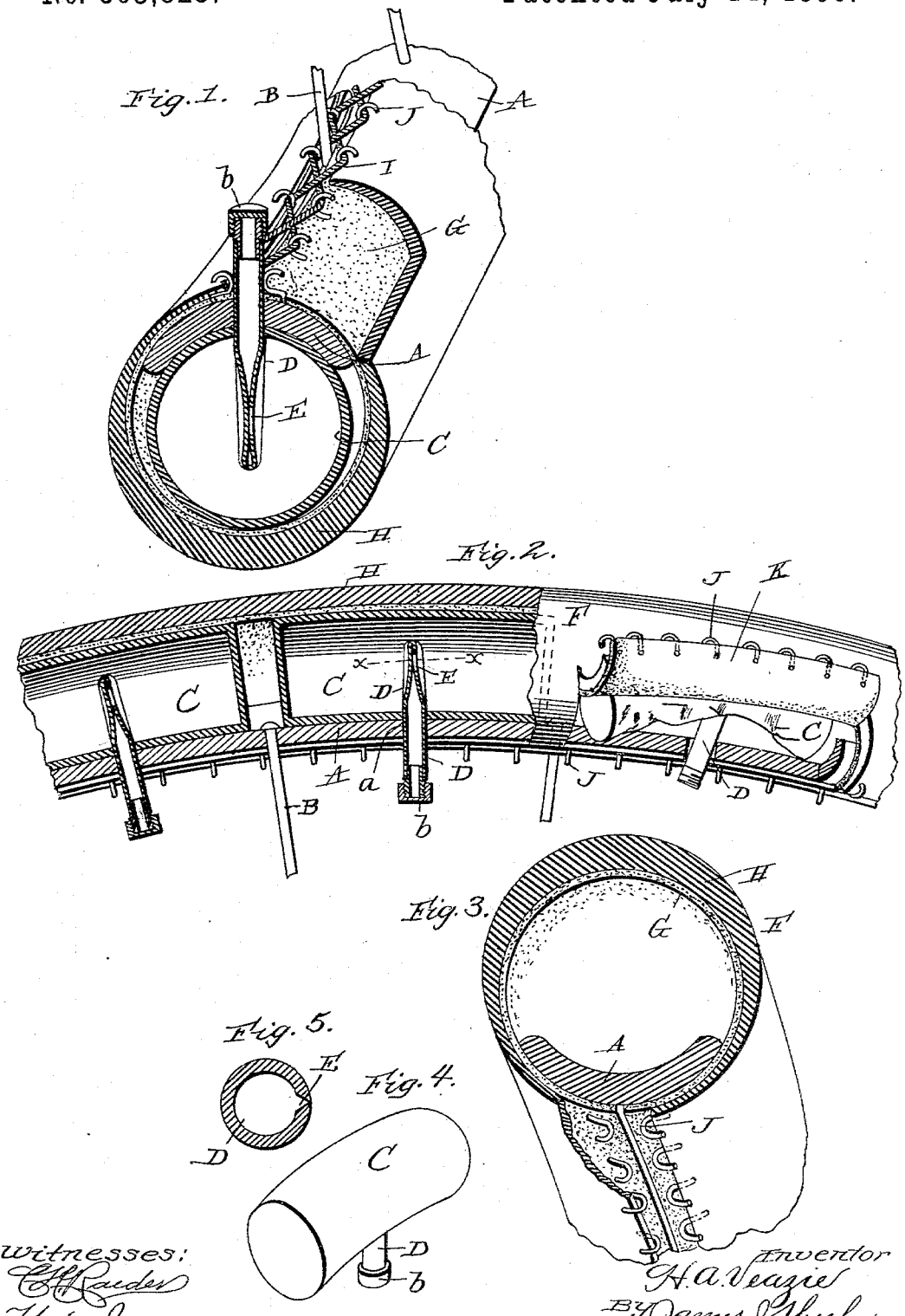

UNITED STATES PATENT OFFICE.

HENRY A. VEAZIE, OF NEW ORLEANS, LOUISIANA, ASSIGNOR OF ONE-HALF TO ROBERT G. MEMORY, OF SAME PLACE.

WHEEL-TIRE.

SPECIFICATION forming part of Letters Patent No. 563,823, dated July 14, 1896.

Application filed March 12, 1896. Serial No. 582,935. (No model.)

*To all whom it may concern:*

Be it known that I, HENRY A. VEAZIE, a citizen of the United States, residing at New Orleans, in the parish of Orleans and State of Louisiana, have invented certain new and useful Improvements in Wheel-Tires; and I do declare the following to be a full, clear, and exact description of the invention, such as will enable others skilled in the art to which it appertains to make and use the same.

My invention relates to improvements in pneumatic tires for bicycle and other wheels; and its novelty and advantages will be fully understood from the following description and claim, when taken in conjunction with the accompanying drawings, in which—

Figure 1 is a perspective sectional view, with parts broken away of a portion of a wheel equipped with my improvements. Fig. 2 is a side elevation of the same with parts in section. Fig. 3 is a detail perspective sectional view illustrating the wheel-felly and the improved cover for the air-tube or air sections or compartments of a pneumatic tire. Fig. 4 is a perspective view of one of the inflatable sections or compartments removed. Fig. 5 is an enlarged transverse section of one of the inflation-tubes, taken in the plane indicated by the line *x x* of Fig. 2.

In the said drawings similar letters designate corresponding parts in all of the several views, referring to which—

A B indicate the felly and spokes, respectively, of a bicycle or other wheel, and C indicates the inflatable sections or compartments of my improved tire, which are preferably of the proportional length and diameter illustrated, although they may be of any suitable length and diameter. These sections or compartments C, which are separate and distinct from each other, may be formed of rubber or other suitable material, and they are arranged end to end upon the wheel-felly A (see Fig. 2) and are each provided with an inflation-tube D, which extend through apertures *a* in the felly A, as illustrated.

The inflation-tubes D extend well into the sections or compartments C, as illustrated, and their portions within said sections or compartments are formed of thin rubber or other material suitable to the purposes hereinafter described. The portions of the tubes D without the sections or compartments C are also preferably formed of rubber, although other suitable material may be employed, and they preferably have their outer open ends normally covered by caps *b*, to exclude dust and the like.

Within the sections or compartments C the tubes D are provided with the apertures or slits E. The walls of these apertures or slits E converge toward the outer sides of the tubes, where they meet, as better shown in Fig. 5, and therefore it will be seen that they will permit the passage of air from the tubes into the sections C, but will prevent a return passage of the air. The peculiar form of the apertures or slits E is preferable for the reason stated, but I do not desire to be understood as confining myself to such a form of aperture, as the prevention of the escape of air from the sections or compartments does not depend altogether upon the form of the said apertures, as will be presently understood.

The sections or compartments C are inflated separately through the medium of an air-compressing device, which is connected with the tubes D in the ordinary or any approved manner. When such compressing device is actuated, the air will enter the tube D, with which the device is connected, and the inner end of the tube being closed, such air will pass through the aperture E and into the section or compartment C, to inflate the same.

When the air-compressing device is disconnected from the tube D, it will be seen that the pressure within said tube is removed. In consequence of this and the fact that the tube D is made of thin material, it will be seen that the pressure within the compartment or section C, acting against the outside of the tube, will collapse and close the tube, and the escape of air through the tube will consequently be effectually prevented.

F indicates the cover of the tire, which rests over the sections or compartments C, as illustrated. This cover F may be of any suitable construction; but I prefer, for the sake of strength and durability, to have it comprise the inner layer G, of canvas or other suitable material (textile), and the outer layer H, of rubber, which is connected to the layer G by cement or other suitable means. The rubber layer H, which is increased in thickness at the tread, need only cover the canvas layer G at such tread. I prefer, however, to have the reduced portions of the rubber layer extend almost to the edges of the canvas layer, as better shown in Fig. 3.

The cover F, as stated, rests over the sections or compartments C, and it is of such a width, as shown, as to enable it to lap over the inner side of the wheel-felly A; and it is secured to said felly and the wheel by the cord I, which is laced to and fro on the hooks J, with which the cover F (preferably the canvas layer thereof) is provided, as better shown in Fig. 3 of the drawings.

Through the medium of the cord or lace I the cover F may be quickly secured to the felly to hold the sections or compartments C in position thereon, and the said cord or lace also permits of the cover being readily disconnected from the felly to afford access to the sections or compartments when a punctured or damaged one is to be replaced by a new one. For this purpose, however, I prefer to slit the cover F transversely on one or both sides of the tire (preferably on one side) at points at or adjacent to the ends of the compartments or sections C to form flaps K, as shown in Fig. 2. In virtue of this provision it will be seen that when a punctured section is located all that is necessary is to disconnect the lace or cord I from the hooks on the flap K opposite the punctured section, and then raise said flap, as shown in Fig. 2, when the punctured section may be removed and replaced by a new section without disturbing the other sections or compartments and the connection of the remainder of the cover F.

In conclusion, I desire it distinctly understood that when desired my improved inflatable sections or compartments may be used in conjunction with any suitable cover secured upon the wheel in any suitable manner.

I also desire it distinctly understood that when desired the peculiar cover and the peculiar means for connecting it to a wheel may be used in conjunction with the ordinary endless inflatable tubes, or any other inflatable tubes or compartments to which it is suitable.

I further desire it understood that I may provide tire covers of the ordinary or any suitable construction with the improved flaps K.

I would also have it understood that my improved inflation-tube is applicable to the ordinary inflatable tubes of bicycles and to the inflatable devices of footballs and other inflated articles.

Having described my invention, what I claim, and desire to secure by Letters Patent, is—

A wheel comprising a felly, a tire having a plurality of separate inflatable sections or compartments arranged end to end upon the felly, and the cover arranged over the inflatable sections or compartments and lapped over the inner side of the felly and provided with devices for the engagement of a lace; the said cover being divided by transverse slits into flaps K, corresponding in length to the inflatable sections or compartments, and a lace engaging the devices of the cover and securing the same upon the felly, substantially as and for the purpose specified.

In testimony whereof I affix my signature in presence of two witnesses.

HENRY A. VEAZIE.

Witnesses:
T. J. ALEIX,
JAMES R. GUTHRIE.